Sept. 1, 1959      E. WINTER      2,902,620
SUPPLY CATHODE

Filed Feb. 26, 1954      2 Sheets-Sheet 1

INVENTOR.
ERNO WINTER
BY Mock & Blum
ATTORNEYS

Sept. 1, 1959  E. WINTER  2,902,620
SUPPLY CATHODE

Filed Feb. 26, 1954  2 Sheets-Sheet 2

POROUS BODY OF METALLIC MATERIAL CONTAINING
AT LEAST 10% OF AT LEAST ONE PLATINUM METAL

INVENTOR.
ERNO WINTER
BY Mock & Blum
ATTORNEYS

United States Patent Office

2,902,620
Patented Sept. 1, 1959

2,902,620

SUPPLY CATHODE

Erno Winter, Budapest, Hungary, assignor to Egyesult Izzolampa es Villamossagi Reszvenytarsasag, Budapest, Hungary, a firm Application February 26, 1954, Serial No. 429,954

Claims priority, application Hungary March 4, 1953

10 Claims. (Cl. 313—346)

This invention relates to supply cathodes of the type having a working surface and comprising a container body, a sintered porous body for serving as the lid of the container body, the container body and the porous body enclosing a supply chamber and the pores of the porous body forming the only passages from within the chamber, and an activating material accommodated within the chamber. Furthermore, the invention relates to preferable methods for manufacturing such porous bodies.

Hot-cathodes consisting of a filament of platinum coated with an active material such as metallic barium have been known for a long time. Such cathodes are described in applicant's British patent specifications Nos. 289,763 and 311,705, respectively. According to these disclosures, the metallic filament may consist either of mere platinum or of an alloy of platinum such as platinum-iridium or platinum-nickel. The use of filaments made of platinum have been declared as advantageous since the metal of such filaments forms an alloy with the metallic barium whereby a directly heated cathode of even emission and long life-time can be obtained. However, for some reason or other such cathodes are out of use in the present days.

Instead, so called "supply cathodes" have been suggested lately the active material of which is accommodated within a supply chamber enclosed by a container body and a sintered porous body serving as the lid of the container body in such a manner that the pores of the porous body form the only passages from within the chamber. The lid has generally been made of a metal having a high melting point such as tungsten, molybdenum, tantalum or eventually niobium and hafnium. Such porous bodies, however, have the drawback that the usually applied active materials are little apt to form an alloy therewith, at least under the usual manufacturing and operative circumstances of the cathodes.

The present invention aims at eliminating the above said drawback and at procuring a supply cathode the porous body of which readily forms an alloy with the active material, at least along the contacting surfaces. The invention is based upon the discovery that such favourable conditions can be obtained if the activating material accommodated within the supply chamber is adapted to yield, at least in the activated state of the cathode, at least one active metal well known in the art or described in applicant's co-pending application Ser. No. 429,955 filed March 1, 1954 through the passages in said porous body for having the working surface of the cathode continuously rendered active whilst the porous body is formed by a metallic material having a content of at least one of the metals platinum, iridium, rhodium and osmium hereinafter referred to as platinum metals and adapted to form an alloy with at least a substantial portion of the active metal. In other words, the main point is that on one hand, the activating material yield, at least in the activated condition of an active metal, i.e. an alkaline metal or an alkaline earth metal in its metallic state notwithstanding whether the activating material contains such a metal in its metallic state or in any form of a compound or alloy and, on the other hand, the porous body contain at least one of the above mentioned platinum metals on such places that it may contact with the active metal when the latter traverses the pores of the porous body forming the lid. The platinum metals used have the special effect of binding alkaline-earth metals in the form of a transitional alloy and thereby reducing vaporization of these metals.

Another object of the invention consists in improving the construction of supply cathodes so as to be more suitable for working when furnished with the above said active materials and porous bodies.

Other objects and features of the invention will be understood from the following descripion and claims, reference being taken to the accompanying drawings in which:

Figure 1:
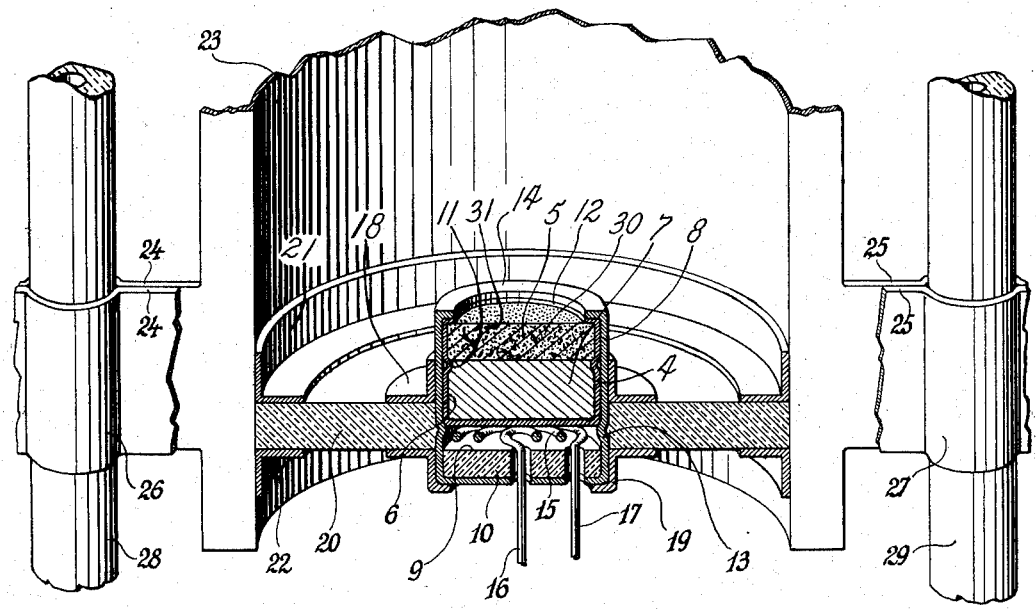
Fig. 1 shows the perspective view, partly in axial section, of a cathode constructed in accordance with the present invention and attached to the inner mantle surface of a Wehnelt-cylinder.
Figure 2:
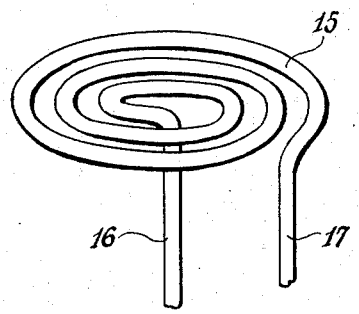
Fig. 2 is the perspective view of a preferable form of the heating spiral used with the cathode, as shown in Fig. 1.

Referring to Fig. 1, the supply cathode illustrated comprises a container body 4 made of molybdenum, nickel, tungsten or the like, and, a sintered porous body 5, hereinafter described in closer details, for serving as the lid of the container body 4 and enclosing with the latter a supply chamber 6. Within the supply chamber 6 there is accommodated an activating material 7 known by itself, or prepared in accordance with applicant's copending application filed under Ser. No. 429,955 on March 1, 1954, which is adapted to yield an active metal in the above described manner. In the embodiment shown, activating material 7 fills up the supply chamber 6 completely. However, it is possible to have it occupy but a portion of the supply chamber 6 as is known to those skilled in the art. Moreover, the container body 4 snugly fits into a cylindrically shaped vessel 8 made likewisely of molybdenum, nickel, tungsten or the like, leaving a disklike interstice or heating chamber 9 between the bottom of the container body 4 and a disklike insert 10 made of a ceramic material and snugly fitted in the bottom part of the vessel 8. The mutual position of the container body 4, the lid 5 and activating material 7 is determined by a shoulder 11 and by a rim 12 of the container body 4, respectively. The mutual position of the container body 4 and the vessel 8 is likewisely secured by a shoulder 13 and a rim 14, respectively, of the vessel 8. Instead of by means of the shoulders 11 and 12 the mutual position of the said elements might as well be secured by any suitable means, e.g. by welding. Within the interstice or heating chamber 9 there is accommodated the heating means 15 of the cathode the supply leads of which are designated by reference numerals 16 and 17, respectively, and led through suitably formed registering lead guiding passages of the ceramic disk 10 and the bottom part of the vessel 8. In order to ensure an evenly distributed heating effect along the bottom surface of the container body 4, the heating means 15 is formed as a flat spiral, shown more distinctly in Fig. 2, the turns of which lie in a plane parallel to the bottom surface of the container body 4. The ceramic disk 10 might be substituted by a disk of another suitable heat insulating material or dispensed with altogether.

The cathode as a whole is secured by annular fastening means 18 and 19, respectively, made of nickel, molybdenum or the like, to a disk 20 made of ceramic material which, in turn, is secured by means of ring-shaped fastening means 21 and 22, respectively, made likewisely of nickel, molybdenum or the like, to the inner mantle surface of a Wehnelt-cylinder 23 well known to those skilled in the art. The Wehnelt-cylinder 23 is composed of two symmetrical parts each of which is provided with brackets 24 and 25, respectively, forming together with their counterparts 24, 25, loops 26 and 27 which are slidably arranged on pillars 28 and 29 of ceramic material, respectively, as is well known to those skilled in the art.

Figure 3:
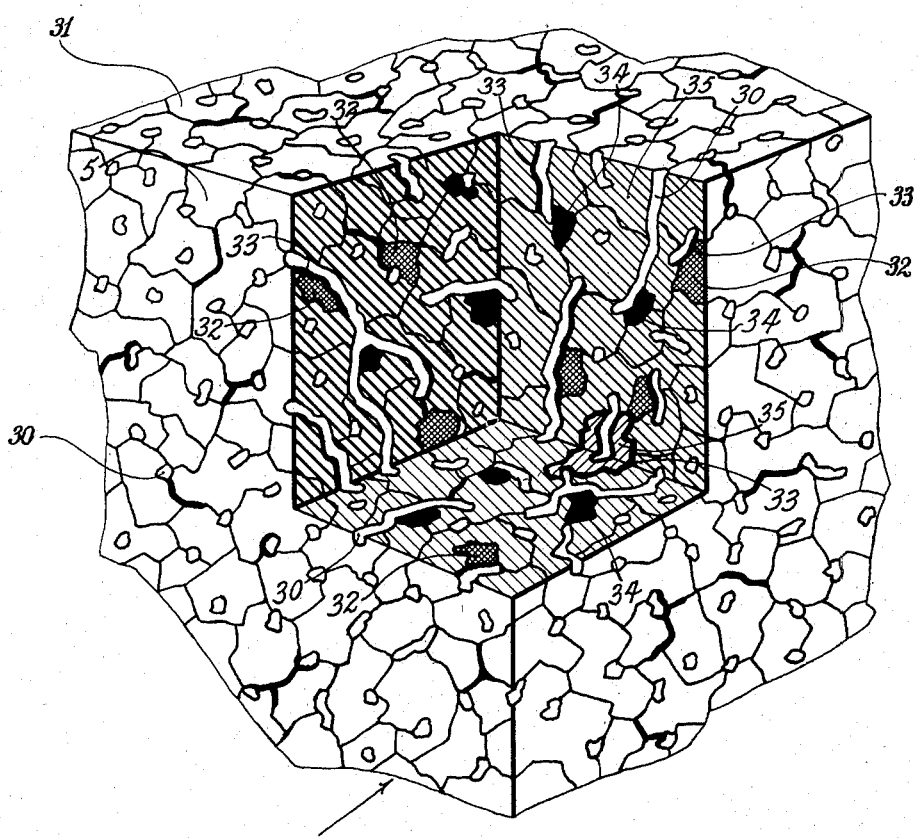
Fig. 3 illustrates, partly in section, a diagrammatic perspective view of a porous body made in compliance with the present invention.

As to the lid 5 formed by a sintered porous body, a portion thereof is illustrated on a larger scale and diagrammatically in Fig. 3. As the result of the sintering process the grains of the material forming the lid 5 adhere to one another so as to confine the pores 30 therebetween which obviously form the only passages from within the supply chamber 6, that is between the spaces above and below the lid 5. The porous body 5 is formed—in compliance with the main feature of the invention—at least partly by a metallic material having a content of at least one of the platinum metals.

If the substances for the lid 5 and the material 7 are selected in the above described manner, the alkaline metal or alkaline earth metal yielded in its metallic state by the activating material 7 through the passages 30 in the porous body forming the lid 5 forms an alloy with the platinum metals of the lid along their contacting surfaces thereby continuously rendering active the working surface 31 of the cathode.

The above mentioned porous body can—within the scope of the invention—be of various compositions. It may consist of platinum. It may, however, be formed by an alloy of at least one of the platinum metals with at least one other metal. Furthermore, the porous body might be formed by an alloy of platinum and iridium or platinum and nickel. It may also consist of a metal having a melting point higher than that of nickel and coated with at least one of the platinum metals. Finally, it might preferably be formed by tungsten coated with a layer of platinum. All these embodiments of the porous body will more particularly be apparent, by way of illustration, from the following examples:

*Example 1*

In order to form a sintered porous body in compliance with the present invention, platinum per se is sintered in the usual manner to such an extent that the pores of the resulting sintered body occupy 10% to 50% by volume, i.e. the specific weight of the sintered body lie within the range of 50% to 90% of that of the solid material. The sintered porous body is then cut to the desired shape.

*Example 2*

In order to form a sintered porous body in compliance with the present invention, an alloy of 95% by weight of platinum and 5% by weight of iridium is sintered in the usual manner to such an extent that the pores of the resulting sintered body occupy 10% to 50% by volume, i.e. the specific weight of the sintered body lie within the range of 50% to 90% of that of the solid material. The sintered porous body is then cut to the desired shape.

The iridium content may vary slightly. Generally a relatively small amount of iridium will suffice.

*Example 3*

In order to form a sintered porous body in compliance with the present invention, 94.5% by weight of platinum and 5.5% by weight of rhodium is sintered in the usual manner to such an extent that the pores of the resulting sintered body occupy 10% to 50% by volume, i.e. the specific weight of the sintered body lie within the range of 50% to 90% of that of the solid material. The sintered porous body is then cut to the desired shape.

The rhodium content may vary slightly. Generally a relatively small amount of rhodium will suffice.

*Example 4*

In order to form a sintered porous body in compliance with the present invention, 95.5% by weight of platinum and 4.5% by weight of osmium is sintered in the usual manner to such an extent that the pores of the resulting sintered body occupy 10% to 50% by volume, i.e. the specific weight of the sintered body lie within the range of 50% to 90% of that of the solid material. The sintered porous body is then cut to the desired shape.

The osmium content may vary slightly. Generally a relatively small amount of osmium will suffice.

*Example 5*

In order to form a sintered porous body in compliance with the present invention, 50% by weight of platinum and 50% by weight of nickel are alloyed with one another and the resulting alloy is sintered in the usual manner to such an extent that the pores of the resulting sintered body occupy 10% to 50% by volume, i.e. the specific weight of the sintered body lie within the range of 50% to 90% of that of the solid material. The sintered porous body is then cut to the desired shape.

The platinum content of the above mentioned platinum-nickel alloy may lie within the range of 10% to 50% by weight.

Moreover, a sintered porous body consisting of an alloy of platinum and nickel might also be produced by means of nickel oxide. In such cases, however, a reduction by means of hydrogen is indispensable.

*Example 6*

In order to form a sintered porous body in compliance with the present invention, 30% by weight of iridium and 70% by weight of nickel are alloyed with one another and the resulting alloy is sintered in the usual manner to such an extent that the pores of the resulting sintered body occupied 10% to 50% by volume, i.e. the specific weight of the sintered body lie within the range of 50% to 90% of that of the solid material. The sintered porous body is then cut to the desired shape.

The iridium content of the above mentioned alloy may vary within the range of 10% to 50% by weight.

A sintered porous body consisting of iridium and nickel may likewisely be produced by means of nickel oxide. In such cases, however, a reduction by means of hydrogen is indispensable.

*Example 7*

In order to form a sintered porous body in compliance with the present invention, 10% by weight of platinum, 40% by weight of nickel and 50% by weight of tungsten are alloyed with one another and the resulting alloy is sintered in the usual manner to such an extent that the pores of the resulting sintered body occupy 10% to 50% by volume, i.e. the specific weight of the sintered body lie within the range of 50% to 90% of that of the solid material. The sintered porous body is then cut to the desired shape.

The tungsten content of the above mentioned triple alloy may vary within the range of 40% to 80% by weight.

*Example 8*

A preferable method of forming a sintered porous body in compliance with the present invention consists in mixing platinum chloride of the formula $H_2PtCl_6$ is as highly concentrated a state as possible with tungsten powder, the proportions being selected so as to yield the desired content of metallic platinum. The mixture is then evaporated to dryness while being stirred and heated and, eventually, exposed to vacuum. Thereafter the mixture is sintered in the manner usual with the sintering process of tungsten. However, the temperature of sintering shall not exceed 1400 to 1500° centigrade since the platinum content decreases the temperature which would, otherwise, be necessary for sintering the tungsten. The sintering process is effected to such an extent that the pores of the resulting sintered body occupy 10% to 50% by volume, i.e. the specific weight of the sintered body lie within the range of 50% to 90% of that of the solid material. A considerable portion of sintered porous bodies of this manufacture will be coated and in most cases superficially alloyed with platinum.

Other portions thereof will consist alternately of an alloy of platinum and tungsten, and of mere platinum and tungsten, respectively. With regard to the operation of the cathode, the point is that the platinum occupy places where it is able to contact at least with a considerable portion of the substances traversing the pores, that is with the metallic alkaline metals and alkaline earth metals issuing from the activating material.

The sintered porous body is then cut to the desired shape.

A sintered porous body made in accordance with the methods described in Example 8 is illustrated in Fig. 3 by way of demonstration, however without claiming accuracy as to real form and quantitative relations. Reference numeral 32 indicates portions consisting of an alloy of platinum and tungsten and coated with a layer 33 of platinum. Other portions 34 consist of mere platinum and portions 35 consist of mere tungsten some of which are likewisely coated with a layer 33 of platinum.

*Example 9*

Another preferable method to form a sintered porous body in compliance with the present invention consists in that a sintered porous body made of tungsten in the usual manner and cut or formed to the desired shape is placed in a vessel and covered with a solution of platinum chloride of the formula $H_2PtCl_6$. The vessel is then closed and its contents subjected to vacuum and eventually to heating whereby the gases within the pores of the sintered porous tungsten body are expelled so that upon cutting off the vacuum source the platinum chloride penetrates into the pores of the sintered porous tungsten body. The latter thus impregnated with platinum chloride is then, preferably in a reducing atmosphere of hydrogen, heated at a temperature of 1000 to 1400° centigrade in order to decompose the platinum chloride whereby a superficial alloying of the platinum with the tungsten is obtained as well. Fig. 3 applies also to this example with the supposition, however, that the portions 32 and 34 are substituted by portions 35 consisting of mere tungsten.

With the represented embodiment the cathode is constructed in the following way:

The activating material for the cathode is selected as has been described above and put within the preformed container body 4. The lid 5 having been manufactured particularly as described in one of the foregoing examples is then placed within the top portion of the container body 4 so as to lie with the periphery of its bottom surface against the shoulder 11 of the container body 4 whereafter its position is secured by chasing the upwardly protruding portion of the upper rim 12 of the container body 4 down to the upper surface of the lid 5, to wit to the working surface 31 of the cathode.

The ceramic disk 10 is accommodated within the preformed vessel 8 so as to lie against the bottom part thereof with the lead guiding passages for the supply leads 16, 17 of the heating spiral 15 being in registering position. The heating spiral 15 is then placed within the vessel 8 in such a position that the supply leads 16, 17 traverse the registering lead guiding passages within the ceramic disk 10 and the bottom part of the vessel 8 and downwardly protrude therefrom. Thereafter the unit formed by the container body 4 with the lid 5 and the activating material 7 is put within the vessel 8 so as to lie with the periphery of its bottom surface against the shoulder 13 of the vessel 8. The mutual position of the unit 4, 5, 7 and the vessel 8 is then secured by embossing the upwardly protruding rim 14 of the vessel 8 down to the rim 12 of the container body 4.

As the final result of this manufacturing process, there is a cathode unit which can readily be fitted in the opening confined by the fastening means 18, 19 and the ceramic disk 20. Thereafter the supply leads 16 and 17 are sealed to the lead-in wires of an e.g. cathode-ray tube the further steps of the manufacture of which are well known to those skilled in the art and therefore neither represented in the drawing nor described here in closer details.

In operation, the filament current flowing through the heating spiral 15 causes the temperature of the activating material 7 to rise to such a value that the former yields, according to its composition, one or more of the alkaline metals and alkaline earth metals in their metallic state. These active metals traverse the passages 30 and being apt to readily form an alloy with the platinum metals, become alloyed with the platinum metal content of the lid 5 while traversing the passages 30 and arriving at the working surface 31 of the cathode whereby the cathode is activated.

If the activating material 7 did not contain the alkaline metals and alkaline earth metals in their metallic state, to wit the activating material 7 consisted of compounds or alloys of other than metallic nature, a decomposition thereof takes previously place the result of which being one or more of such metals in the metallic state. The point is that in the activated condition of the cathode the activating material 7 yields at least one of the alkaline metals and alkaline earth metals in its metallic state so as to be able to form an alloy with the platinum metal of the lid forming porous body 5.

With the operative conditions of an e.g. cathode-ray tube being granted, upon further heating electrons take off from the working surface 31 of the cathode in an even and continuous flow, their source being the alloy of the alkaline metals and alkaline earth metals of the activating material 7 with the platinum metal of the porous body 5. The loss in such metal component of the lid 5 is continuously compensated from within the supply chamber 6 by further amounts of alkaline metals or alkaline earth metals yielded by the activating material 7 upon heating either directly or by means of decomposition. On the other hand, the improved cathode suitably withstands sudden load changes and extremely pulsating operative conditions since the alkaline metals and alkaline earth metals forming the source of electrons are, by means of forming a suitable slowly decomposing transitory alloy with the platinum metal content of the porous body, well embedded in the substance of the lid 5 and cannot be torn off abruptly thereby causing heavy damages to the cathode and eventually entail a premature exhaustion thereof. The parts and percent specified herein are by weight if not otherwise stated.

What we claim is:

1. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed by a metallic material having a content of at least 10% by weight of at least one of the platinum metals and adapted to form an alloy with at least a substantial portion of said active metal along their contacting surfaces;

2. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed by platinum and adapted to form an alloy with at least a substantial portion of said active metal along their contacting surfaces.

3. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed by an alloy of platinum and iridium, containing at least 10% by weight of platinum and adapted to form an alloy with at least a substantial portion of said active metal along their contacting surfaces.

4. A supply cathode having a working surface and comprising a container body, a sintered porous body for working as a lid of said container body, said container body and said porous body enclosing a supply chamber, the pores of said porous body forming the only passages from within said chamber, an activating material consisting of at least one non-metallic compound of alkaline metals and alkaline earth metals accommodated within said chamber and adapted to yield, at least in the activated condition of the cathode, at least one active metal through the passages in said porous body for having said working surface continuously rendered active, said porous body being formed by an alloy of at least 10% by weight one of the patinum metals with at least one other metal and adapted to form an alloy with at least a substantial portion of said active metal along their contacting surfaces.

5. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed by an alloy of platinum and nickel, containing at least 10% by weight of platinum and adapted to form an alloy with at least a substantial portion of said active metal along their contacting surfaces.

6. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed by a metal having a melting point higher than that of nickel and coated with at least one of the platinum metals and adapted to form an alloy with at least a substantial portion of said active metal along their contacting surfaces.

7. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed by tungsten coated with a layer of platinum and adapted to form an alloy with at least a substantial portion of said active metal along their contacting surfaces.

8. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed by tungsten and impregnated with platinum so as to form, at least in the activated condition of the cathode, a layer of an alloy of platinum with tungsten along the surface of said passages, and adapted to form an alloy with at least a substantial portion of said active metal along their contacting surfaces.

9. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed at least partly by a metallic material having a content of at least 10% by weight of at least one of the platinum metals and adapted to form an alloy with at least a substantial portion of said active metal along their contacting surfaces.

10. A supply cathode having a working surface and comprising a container body, a sintered porous body for serving as a lid of said container body, said container body and said porous body enclosing a supply chamber, the pores of said porous body forming the only passages from within said chamber, an activating material consisting of at least one non-metallic compound of alkaline metals and alkaline earth metals accommodated within said supply chamber and adapted to yield, at least in the activated condition of the cathode, at least one active metal through the passages in said porous body for having said working surface continuously rendered active, said porous body being formed at least partly by a metallic material adapted to form an alloy with at least a substantial portion of said active metal along their contacting surfaces.

References Cited in the file of this patent

UNITED STATES PATENTS

| | | |
|---|---|---|
| 2,121,589 | Espe | June 21, 1938 |
| 2,491,866 | Kurtz et al. | Dec. 20, 1949 |
| 2,509,702 | Stanier | May 30, 1950 |
| 2,543,728 | Lemmons et al. | Feb. 27, 1951 |
| 2,624,024 | Jansen | Dec. 30, 1952 |
| 2,673,277 | Lemmens | Mar. 23, 1954 |
| 2,741,717 | Katz | Apr. 10, 1956 |
| 2,798,180 | Winter | July 2, 1957 |